Patented May 1, 1923.

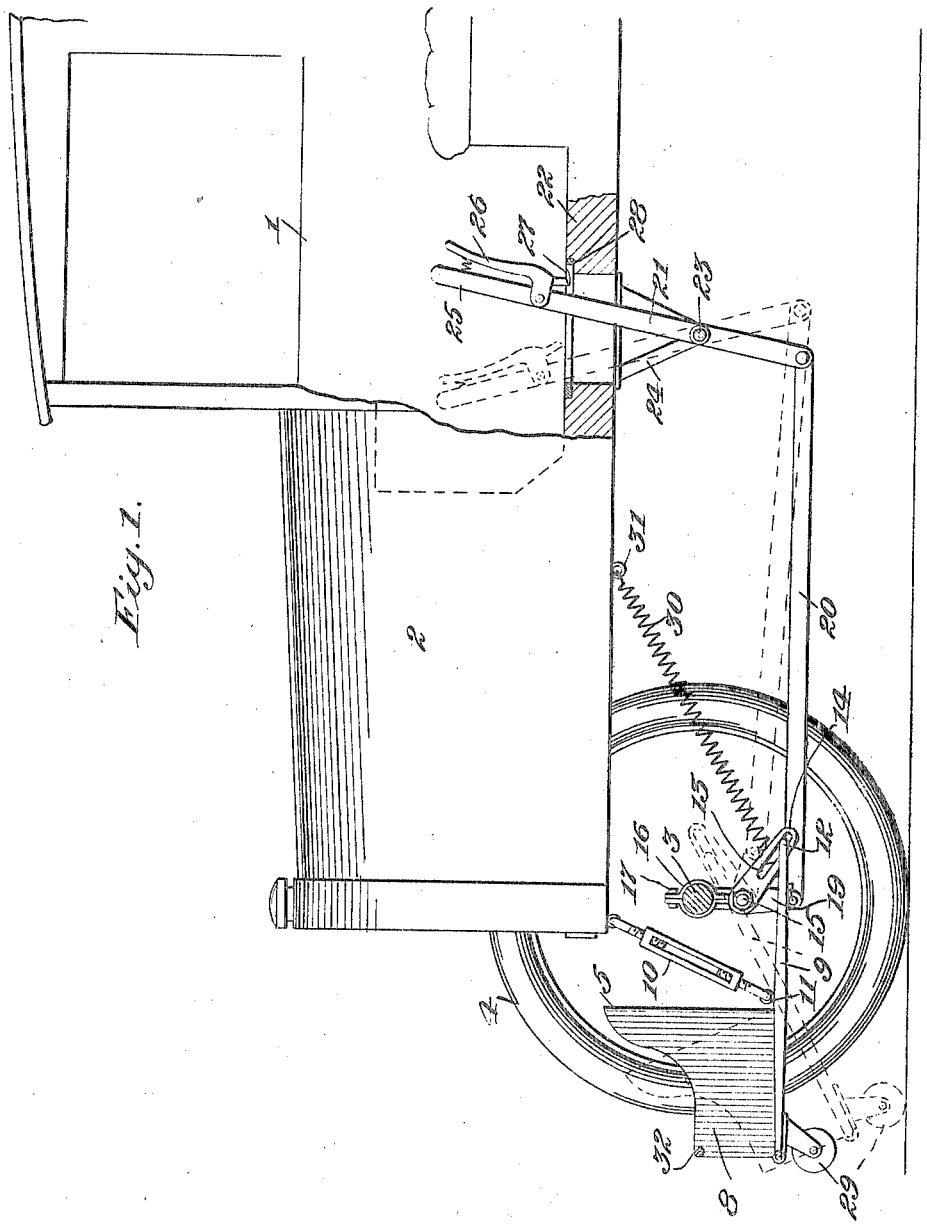

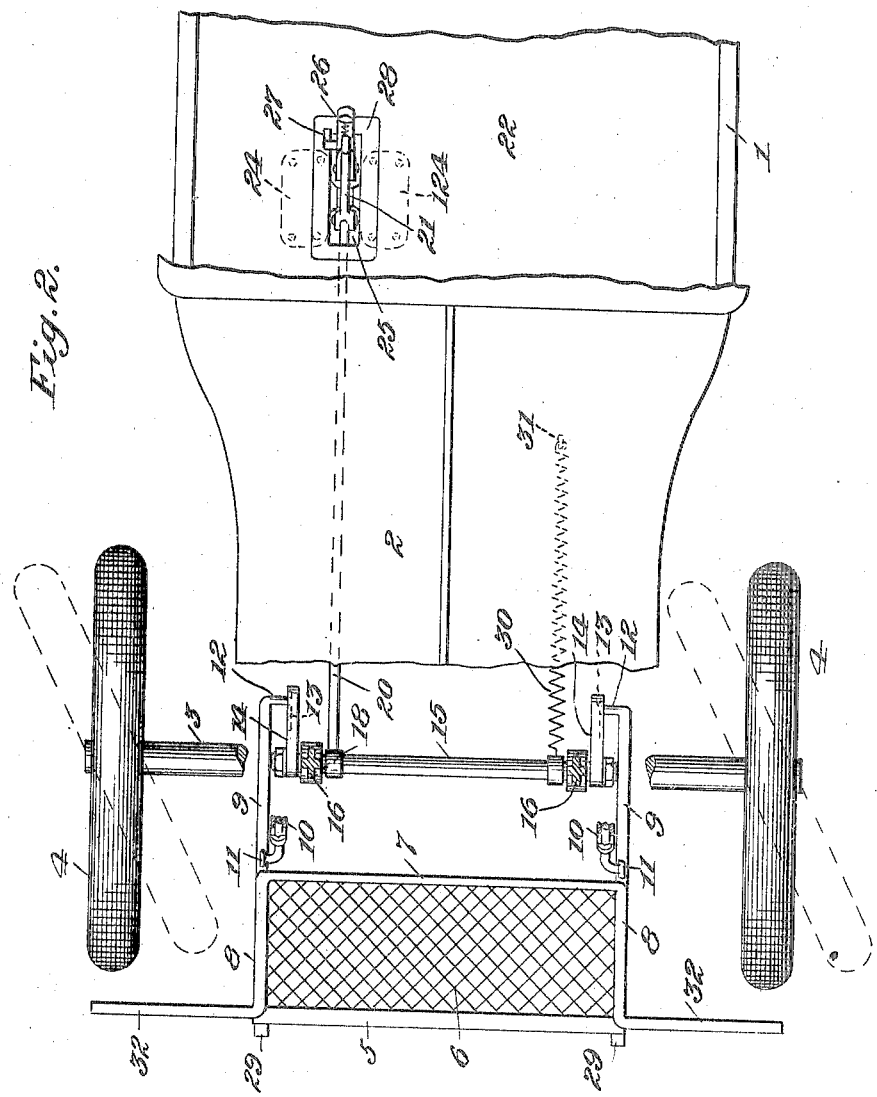

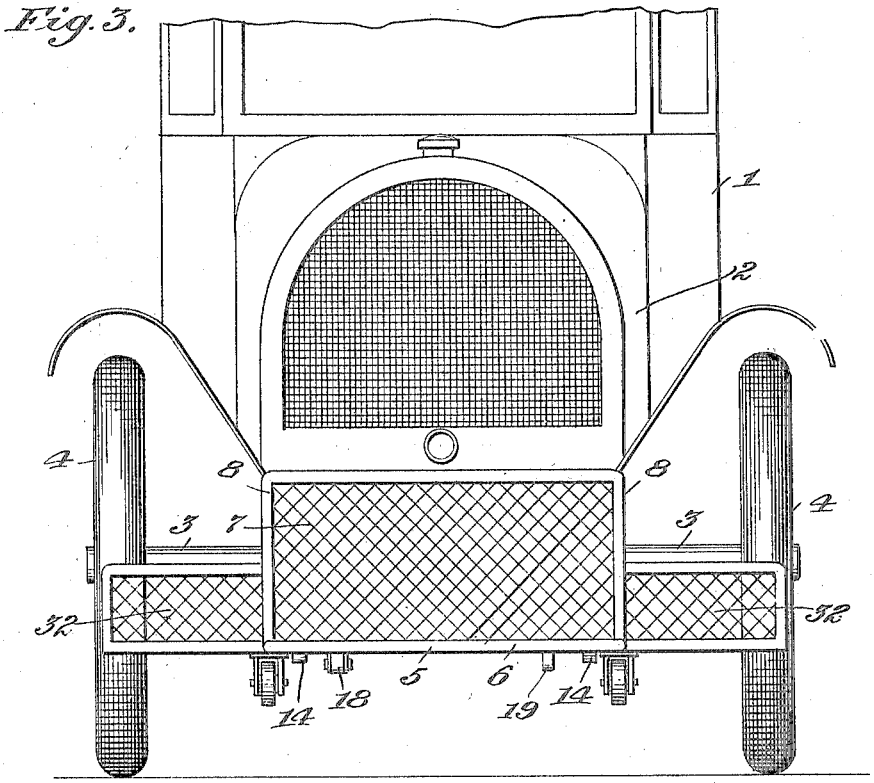
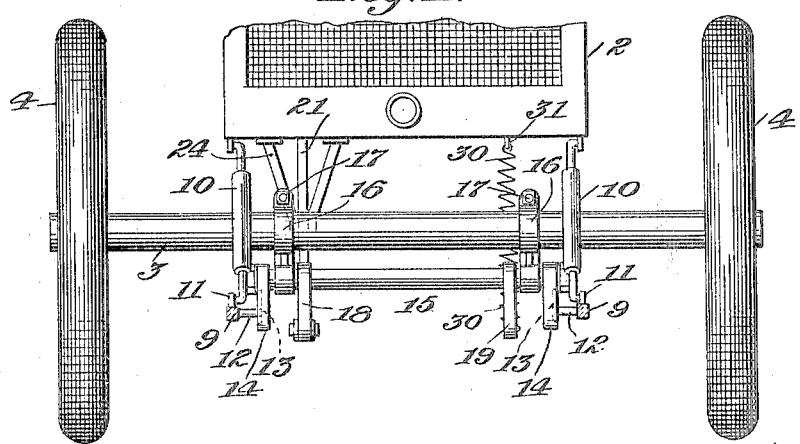

1,453,273

UNITED STATES PATENT OFFICE.

LARIE GRELLA, OF BROOKLYN, NEW YORK.

VEHICLE FENDER.

Application filed January 19, 1923. Serial No. 613,673.

*To all whom it may concern:*

Be it known that I, LARIE GRELLA, a citizen of the United States, residing at Brooklyn, in the county of Kings and State of New York, have invented certain new and useful Improvements in Vehicle Fenders, of which the following is a full, clear, and exact specification.

This invention relates to vehicle fenders, and especially to life saving baskets or catchers for use on automobiles.

One object of the invention is to provide an improved form of catcher or basket to be mounted on the front of an automobile and normally supported with its front edge out of contact with the road. Improved and simplified means are also provided for dropping the front edge of the catcher or basket onto the ground when necessary for picking up a person who cannot avoid being struck.

Another object is to provide a tilting basket or catcher with lateral wings extending in front of the fore wheels of the automobile and arranged to permit the free turning of said wheel in steering. A further object is to so construct the fender or catcher and its operating means that they may be readily applied to many known makes of automobiles without materially altering the construction of the latter. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation, partly in section, of the front end portion of an automobile equipped with a fender or life saving basket constructed and attached substantially in accordance with this invention.

Figure 2 is a plan view of the same parts with certain portions broken away for the sake of clearness in illustrating other portions.

Figure 3 is a front elevation of the fender and automobile with part of the top of the latter broken away, and Figure 4 is a front elevation of the lower part of the front end of the automobile with the basket and lateral wings broken away to illustrate more clearly the other parts of the invention.

In the drawings 1 designates the body of an automobile, 2 the engine hood, 3 the front axle, and 4 the front or steering wheels of the machine. The basket or catcher 5 is preferably formed like a couch or seat with a bottom 6 and back 7 preferably of rope or wire mesh material, and ends of sheet metal, wood or other suitable material as best shown at 8 in Figure 1. Said basket or seat 5 is mounted on a pair of parallel beams or bars 9 extending rearward therefrom and substantially parallel to the longitudinal axis of the automobile. The catcher or basket 5 is supported at the front end of the automobile preferably by a pair of turnbuckle rods 10 which are fastened to the beams or bars 9 behind the back of the catcher, as at 11. The rear ends of said beams or bars 9 extend back below and in rear of the front axle 3 of the automobile, where said bars have inwardly extending lugs or pins 12 engaging in slots or grooves 13 in a pair of arms 14 mounted to swing with a rock shaft 15 journaled below said front axle 3.

Said rock shaft 15 may be journaled in straps or hangers 16 secured to the front axle 3 in any suitable manner, as by the clamping bolts 17, which permits the attachment to be readily made to the automobile axle at any time. The rock shaft 15 also has fixed thereto two other arms 18 and 19, the former of which is pivoted to a connecting rod or link 20 extending rearwardly and also pivoted to a hand lever 21 reaching up through the floor 22 of the body 1 of the car. Said hand lever 21 is intermediately pivoted at 23 to hangers 24 secured to the under face of the floor 22, while the portion of the lever above said pivot extends up through a slot 25 in said floor and terminates some distance above the floor. A spring pressed latch or dog 26 is pivoted on the upper end portion of the hand lever and is adapted to engage with a notch 27 in a floor plate 28 for retaining said lever in the position shown in solid lines in Figure 1 in which position the basket of catcher 5 is supported in horizontal position with its front edge out of contact with the road. When the dog or pawl 26 is released from the notch 27 in the floor plate, the lever 21 may move to the dotted line position in Figure 1 so as to permit the front edge of the catcher or basket 5 to drop to the road, the supporting beams or bars 9 therefor swinging about the lower ends 11 of the turnbuckle rods 10, as also illustrated in dotted lines. The front edge of the catcher is equipped with wheels or rollers 29 for supporting the same on the road when in lowered or dropped position. The arm 19 on the rock shaft has a coiled spring 30 attached thereto, said spring being also attached to the floor of the automobile or bottom of the engine hood, as at 31, and serving to automatically drop the front edge of the catcher to the ground when the pawl 26 on the lever 21 is released from the notch in the floor plate.

The catcher or basket 5 has lateral wings 32, preferably made like the bottom and back of said basket and extending in front of the wheels 4. As best shown in Figure 2, the ends 8 of the catcher or basket are spaced sufficiently from the wheels 4 to allow for the latter turning, as indicated in dotted lines, for steering without coming in contact with said ends. Said wings are rigidly attached to the basket and are dropped with its front edge, in line with which they are arranged, so as to prevent a person struck by the fender from being run over by the wheels.

It will be understood that the normal position of the fender or life saving basket is that shown in solid lines in Figure 1, and that when in that position the wheels or casters 29 on the front edge of said basket are out of contact with the road so that they do not interfere with the running of the machine in the ordinary way. When the driver of the car finds that a collision with a pedestrian cannot be avoided, he has only to strike the upper end portion of the pawl 26 to release the lower end thereof from the notch 27 in the floor plate 28, whereupon the spring 30 acts to drop the front edge of the basket to the position shown in dotted lines in Figure 1, when the rollers or caster wheels 29 will rest upon or run along the road and serve to support the weight of a person who may fall into said basket.

I claim:—

1. A fender for automobiles comprising intermediately pivoted longitudinal bars, a catcher on the outer end portions of said bars, a rock shaft operatively engaging the inner ends of said bars, whereby the catcher may be raised or lowered by rocking said shaft, and means for rocking said shaft.

2. A fender for automobiles comprising intermediately pivoted longitudinal bars, a catcher on the outer end portions on said bars, a rock shaft operatively engaging the inner ends of said bars, whereby the catcher may be raised or lowered by rocking said shaft, means for rocking said shaft, and means for locking said shaft in position for retaining the catcher raised.

3. A fender for automobiles comprising intermediately pivoted longitudinal bars, a catcher on the outer end portions of said bars, a rock shaft having slotted arms engaged by the inner ends of said bars, means for rocking said shaft for raising and lowering the catcher, and means for locking said shaft in position for retaining the catcher raised.

4. A fender for automobiles comprising intermediately pivoted longitudinal bars, a catcher on the outer end portions of said bars, turnbuckle rods for supporting and fulcruming said bars, a rock shaft having slotted arms engaged by said arms at their inner ends, means for rocking said shaft for raising and lowering the catcher, and means for locking said shaft in the raised position of the catcher.

5. A fender for automobiles comprising intermediately pivoted longitudinal bars, a catcher on the outer end portions of said bars, a rock shaft having slotted arms engaged by the inner ends of said bars, another arm on said shaft, a hand lever for actuating said rock shaft for raising and lowering the catcher, said lever being connected to said last mentioned arm on the shaft, and means for locking said lever for retaining the catcher in raised position.

6. A fender for automobiles comprising intermediately pivoted longitudinally extending bars, a catcher on the outer end portions of said bars, a rock shaft having slotted arms engaged by the inner ends of said bars, means for rocking said shaft for raising and lowering the catcher, means for locking the shaft for retaining the catcher in raised position, and resilient means for swinging said shaft to lower the catcher when said locking means is released.

7. A fender for automobiles comprising intermediately pivoted longitudinal bars, a catcher on the outer ends of said bars, a rock shaft having slotted arms engaged by the inner ends of said bars, means for rocking said shaft for raising and lowering the catcher, means for locking the shaft to retain the catcher in raised position, another arm on said shaft, and a spring acting on said arm for swinging the bars to lower the catcher when said locking means is released.

8. A fender for automobiles comprising intermediately pivoted longitudinal bars, a catcher on the outer ends of said bars, a rock shaft having slotted arms engaged by the inner ends of said bars, means for positively lowering said catcher when the rock shaft is unlocked, an arm on said shaft, a hand lever pivoted to said last mentioned arm for locking the shaft to raise the catcher, said lever extending into reach of the operator of the automobile, a notched plate, and a spring-pressed pawl mounted on said lever for engaging said notched plate for locking the shaft with the catcher in raised position.

9. A fender for attachment to an automobile comprising longitudinal bars, extensible hangers for supporting said bars from an automobile, said bars being pivotally connected to said hangers at intermediate points on the bars, a rock shaft, hangers for supporting said shaft from the axle of the automobile, a catcher mounted on the outer ends of said bars, slotted arms on said rock shaft engaged by the inner ends of the bars, a lever to be attached to the rock shaft and to the automobile for rocking said shaft in its hangers to raise and lower the catcher, and means for locking said lever in position to hold the catcher raised.

10. A fender for attachment to an automobile comprising longitudinal bars, extensible hangers for supporting said bars from an automobile, said bars being pivoted at intermediate points thereon to said hangers, a rock shaft, hangers for supporting said shaft from the axle of the automobile, a catcher mounted on the outer ends of said bars, slotted arms on said rock shaft engaged by the inner ends of the bars, a lever to be attached to the automobile and connected to the rock shaft for rocking the same in its hangers to raise and lower the catcher, means to lock the lever in position to hold the catcher raised, and resilient means connected to the shaft and adapted to be connected to the automobile for positively lowering said catcher when the locking means is released.

11. A fender for automobiles comprising longitudinal bars intermediately pivoted thereon, a catcher mounted on the outer ends of said bars, means for rocking said bars connected to their inner ends, rollers on the catcher for supporting the same when lowered, means for locking the bars in position for retaining the catcher raised, and means for positively lowering said catcher when said locking means is released.

In testimony whereof I have signed my name to this specification.

LARIE GRELLA.